(12) United States Patent
Waki et al.

(10) Patent No.: US 11,659,114 B2
(45) Date of Patent: May 23, 2023

(54) RECORDING DEVICE WITH FRONT SIDE INSERTION PORT

(71) Applicant: SEIKO EPSON CORPORATION, Tokyo (JP)

(72) Inventors: Shingo Waki, Matsumoto (JP); Tetsuji Yatsunami, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 59 days.

(21) Appl. No.: 17/315,601

(22) Filed: May 10, 2021

(65) Prior Publication Data

US 2021/0354940 A1 Nov. 18, 2021

(30) Foreign Application Priority Data

May 13, 2020 (JP) .............................. JP2020-084614

(51) Int. Cl.
*H04N 1/00* (2006.01)

(52) U.S. Cl.
CPC ....... *H04N 1/00567* (2013.01); *H04N 1/0057* (2013.01); *H04N 1/00575* (2013.01); *H04N 1/00612* (2013.01); *B65H 2404/612* (2013.01)

(58) Field of Classification Search
None
See application file for complete search history.

(56) References Cited

U.S. PATENT DOCUMENTS

| | | | | |
|---|---|---|---|---|
| 6,152,442 A | * | 11/2000 | Nishinohara | B65H 3/5238 271/273 |
| 2014/0320873 A1 | * | 10/2014 | Kato | H04N 1/00578 358/1.12 |
| 2020/0104660 A1 | * | 4/2020 | Ohhashi | G06K 15/1813 |

FOREIGN PATENT DOCUMENTS

JP 2019-196273 A 11/2019

* cited by examiner

*Primary Examiner* — Miya J Williams
(74) *Attorney, Agent, or Firm* — Workman Nydegger (57) ABSTRACT

A recording device includes a recording unit configured to perform recording on a recording target medium, a first conveyance path that is a conveyance path of the recording target medium including an opposite position that faces the recording unit, and conveyance of the recording target medium in a first direction, a second conveyance path being coupled to the first conveyance path at a position downstream of the recording unit in the first direction, the second conveyance path being coupled to the first conveyance path also at a position upstream of the recording unit in the first direction and configured for conveyance of the recording target medium to the first conveyance path with a surface of the recording target medium inverted, and an insertion port configured to enable insertion of a recording target medium as an insertion material to the second conveyance path from outside.

10 Claims, 8 Drawing Sheets

RECORDING DEVICE WITH FRONT SIDE INSERTION PORT

The present application is based on, and claims priority from JP Application Serial Number 2020-084614, filed May 13, 2020, the disclosure of which is hereby incorporated by reference herein in its entirety.

BACKGROUND

1. Technical Field

The present disclosure relates to a recording device.

2. Related Art

In the related art, various recording devices are used. Among them, there is a recording device that includes an inversion path for inverting the recording target medium and can perform recording on both surfaces of the recording target medium. For example, JP-A-2019-196273 discloses an image recording device that includes an inversion conveyance path for inverting the recording target medium and can perform recording on both surfaces of the recording target medium.

A recording device including an inversion path includes an inversion path for inverting the recording target medium in addition to a conveyance path facing a recording unit, and as such tends to increase the size of the device. If, for example, such a recording device including the inversion path is provided with additional functions such as a function for the user to insert the recording target medium from the front surface side of the device by manual feeding to feed the recording target medium and a function of recording an image of a document read with a reading unit configured to read an document, the size of the device is significantly increased due to a configuration including an additionally provided conveyance path for the recording target medium, a configuration including the document reading unit, and the like. In view of this, it is desired to achieve multi-functionality without increasing the size of the device.

SUMMARY

To solve the above-mentioned problems, a recording device according to the present disclosure includes a recording unit configured to perform recording on a recording target medium, a first conveyance path that is a conveyance path of the recording target medium including an opposite position that faces the recording unit, the first conveyance path being configured for conveyance of the recording target medium in a first direction when recording is performed by the recording unit, a second conveyance path that is a conveyance path of the recording target medium, the second conveyance path being coupled to the first conveyance path at a position downstream of the recording unit in the first direction and configured for conveyance of the recording target medium on which recording was performed by the recording unit, the second conveyance path being coupled to the first conveyance path also at a position upstream of the recording unit in the first direction and configured for conveyance of the recording target medium to the first conveyance path with a surface of the recording target medium inverted, and an insertion port configured to enable insertion of a recording target medium as an insertion material to the second conveyance path from outside.

To solve the above-mentioned problems, a recording device according to the present disclosure includes a recording unit configured to perform recording on a recording target medium, a first conveyance path that is a conveyance path of the recording target medium including an opposite position that faces the recording unit, the first conveyance path being configured for conveyance of the recording target medium in a first direction when recording is performed by the recording unit, a second conveyance path that is a conveyance path of the recording target medium, the second conveyance path being coupled to the first conveyance path at a position downstream of the recording unit in the first direction and configured for conveyance of the recording target medium on which recording was performed by the recording unit, the second conveyance path being coupled to the first conveyance path also at a position upstream of the recording unit in the first direction and configured for conveyance of the recording target medium to the first conveyance path with a surface of the recording target medium inverted, and a reading unit provided in the second conveyance path and configured to read a document.

DESCRIPTION OF EXEMPLARY EMBODIMENTS

First, the present disclosure is briefly described below.

To solve the above-mentioned problems, a recording device according to a first aspect of the present disclosure includes a recording unit configured to perform recording on a recording target medium; a first conveyance path that is a conveyance path of the recording target medium including an opposite position that faces the recording unit, the first conveyance path being configured for conveyance of the recording target medium in a first direction when recording is performed by the recording unit; a second conveyance path that is a conveyance path of the recording target medium, the second conveyance path being coupled to the first conveyance path at a position downstream of the recording unit in the first direction and configured for conveyance of the recording target medium on which recording was performed by the recording unit, the second conveyance path being coupled to the first conveyance path also at a position upstream of the recording unit in the first direction and configured for conveyance of the recording target medium to the first conveyance path with a surface of the recording target medium inverted; and an insertion port configured to enable insertion of a recording target medium as an insertion material to the second conveyance path from outside.

According to the present aspect, the insertion port that enables insertion of the recording target medium to the second conveyance path from the outside is provided. Specifically, the second conveyance path serving as an inversion path is used as a path for the user to insert the recording target medium by manual feeding to feed the recording target medium. In this manner, for example, the user can insert the recording target medium by manual feeding from the front surface side of the device to feed the recording target medium without employing a configuration including an additional conveyance path for the recording target medium. Thus, multi-functionality can be achieved without increasing the size of the device.

A recording device according to a second aspect of the present disclosure includes a recording unit configured to perform recording on a recording target medium; a first conveyance path that is a conveyance path of the recording target medium including an opposite position that faces the recording unit, the first conveyance path being configured for conveyance of the recording target medium in a first direction when recording is performed by the recording unit; a second conveyance path that is a conveyance path of the recording target medium, the second conveyance path being coupled to the first conveyance path at a position downstream of the recording unit in the first direction and configured for conveyance of the recording target medium on which recording was performed by the recording unit, the second conveyance path being coupled to the first conveyance path also at a position upstream of the recording unit in the first direction and configured for conveyance of the recording target medium to the first conveyance path with a surface of the recording target medium inverted; and a reading unit provided in the second conveyance path and configured to read a document.

According to the present aspect, the reading unit configured to read the document is provided in the second conveyance path. In this manner, without employing a configuration including a large reading unit configured to read the document, the document can be read and the read image can be recorded on the recording target medium. Thus, multi-functionality can be achieved without increasing the size of the device.

In a recording device according to a third aspect of the present disclosure in the second aspect further includes an insertion port configured to enable insertion of the document as an insertion material to the second conveyance path from outside.

According to the present aspect, the insertion port that enables insertion of the document to the second conveyance path from the outside is provided. That is, the second conveyance path serving as an inversion path is used as the path for the user to insert the document by manual feeding and feed the document. In this manner, for example, the image can be read while feeding the document by inserting the document by manual feeding by the user from the front surface side of the device without employing a configuration including an additional conveyance path for the document. Thus, multi-functionality can be achieved without increasing the size of the device.

In a recording device according to a fourth aspect of the present disclosure in the second or third aspect, the reading unit is disposed in the second conveyance path such that a surface of the document that faces the recording unit in the first conveyance path is readable.

According to the present aspect, the reading unit is disposed in the second conveyance path such that the surface of the document that faces the recording unit in the first conveyance path can be read. In this manner, for example, in the case where the document is used as a recording target medium and an image is recorded on the surface that is the rear surface of the document opposite to the image reading surface, it is possible to prevent the recording unit from mistakenly forming the image on the front surface of the document. When the reading unit detects that an image is formed on the document in advance, it is possible to recognize that the document is mistakenly inserted upside down.

In a recording device according to a fifth aspect of the present disclosure in the fourth aspect, the reading unit is disposed in the second conveyance path such that both surfaces of the document are readable.

According to the present aspect, the reading unit is disposed in the second conveyance path such that both surfaces of the document can be read. In this manner, the document can be efficiently read.

In a recording device according to a sixth aspect of the present disclosure in the first or third aspect further includes an ejection tray configured to receive the recording target medium on which recording was performed by the recording unit. The insertion of the insertion material from the insertion port is enabled by removing the ejection tray.

According to the present aspect, the recording target medium on which recording was performed by the recording unit can be received by the ejection tray. In addition, with the configuration in which the insertion material can be inserted from the insertion port by removing the ejection tray, it is possible to prevent a situation where the ejection tray hinders the insertion of the insertion material.

A recording device according to a seventh aspect of the present disclosure in the sixth aspect further includes a path cover configured to constitute the second conveyance path, the path cover being rotatable around a rotation axis. The path cover serves also as a feeding guide configured to guide the insertion of the insertion material when placement of the path cover is adjusted by rotating the path cover around the rotation axis.

According to the present aspect, the path cover that constitutes the second conveyance path and is rotatable around the rotation axis is provided, and thus, when the insertion material causes conveyance failure in the second conveyance path, the insertion material causing the conveyance failure can be easily removed by rotating the path cover. In addition, the path cover serves also as the feeding guide that guides insertion of the insertion material, and thus the increase of the size of the device can be effectively suppressed.

A recording device according to an eighth aspect of the present disclosure in the first or third aspect further includes an ejection tray configured to receive the recording target medium on which recording was performed by the recording unit. A feeding guide configured to guide the insertion of the insertion material is attachable in place of the ejection tray.

According to the present aspect, the recording target medium on which recording was performed by the recording unit can be received by the ejection tray. In addition, with the configuration in which the feeding guide configured to guide the insertion of the insertion material is attachable in place of ejection tray, it is possible to increase the ease of the insertion of the insertion material while suppressing the increase of the size of the device.

In a recording device according to a ninth aspect of the present disclosure in the eighth aspect, the feeding guide includes an edge guide configured to set a position in a width direction that intersects an insertion direction of the insertion material.

According to the present aspect, the feeding guide includes the edge guide that sets the position in the width direction. In this manner, conveyance failure of the insertion material can be suppressed.

In a recording device according to a tenth aspect of the present disclosure in the eighth or ninth aspect, the feeding guide serves also as an ejection tray configured to receive the recording target medium on which recording was performed by the recording unit and/or a document read by a reading unit configured to read the document.

According to the present aspect, the feeding guide serves also as the ejection tray configured to receive the recording target medium on which recording was performed by the recording unit and/or the document read by the reading unit configured to read the document. In this manner, the recording target medium on which recording was performed by the recording unit can be received by the feeding guide, and the increase of the size of the device can be suppressed.

A recording device according to an eleventh aspect of the present disclosure in any one of the eighth to tenth aspects further includes a sensor configured to detect presence and absence of the recording target medium and the insertion material. Conveyance control of the recording target medium and the insertion material is performed based on a detection result of the sensor.

According to the present aspect, the sensor configured to detect the presence/absence of the target medium and the insertion material is provided, and the conveyance control of the recording target medium and the insertion material is performed based on the detection result of the sensor. In this manner, touching of the recording target medium and the insertion material during the conveyance can be suppressed, and conveyance failure of the recording target medium and the insertion material can be suppressed.

The present disclosure is described in detail below.

Note that in each drawing, the direction along the X axis is the width direction of the device, and is a direction, i.e., the width direction, which intersects the conveyance direction of a recording sheet P serving as an example of a recording target medium. The −X direction and the +X direction are the right direction and the left direction, respectively, as viewed from the user facing the front surface of the device. In addition, the direction along the Y axis is the depth direction of the device, and the +Y direction is the direction from the back surface to the front surface of the device and is a first direction. In addition, the −Y direction is the direction from the front surface to the back surface of the device and is a second direction. In addition, the direction along the Z axis is the vertical direction. The +Z direction is the upward direction in the vertical direction, and the −Z direction is the downward direction in the vertical direction. In the present embodiment, of the side surfaces that constitute the periphery of the device, the side surface where an operation unit 5 is provided is the front surface of the device.

Embodiment 1

Figure 1:
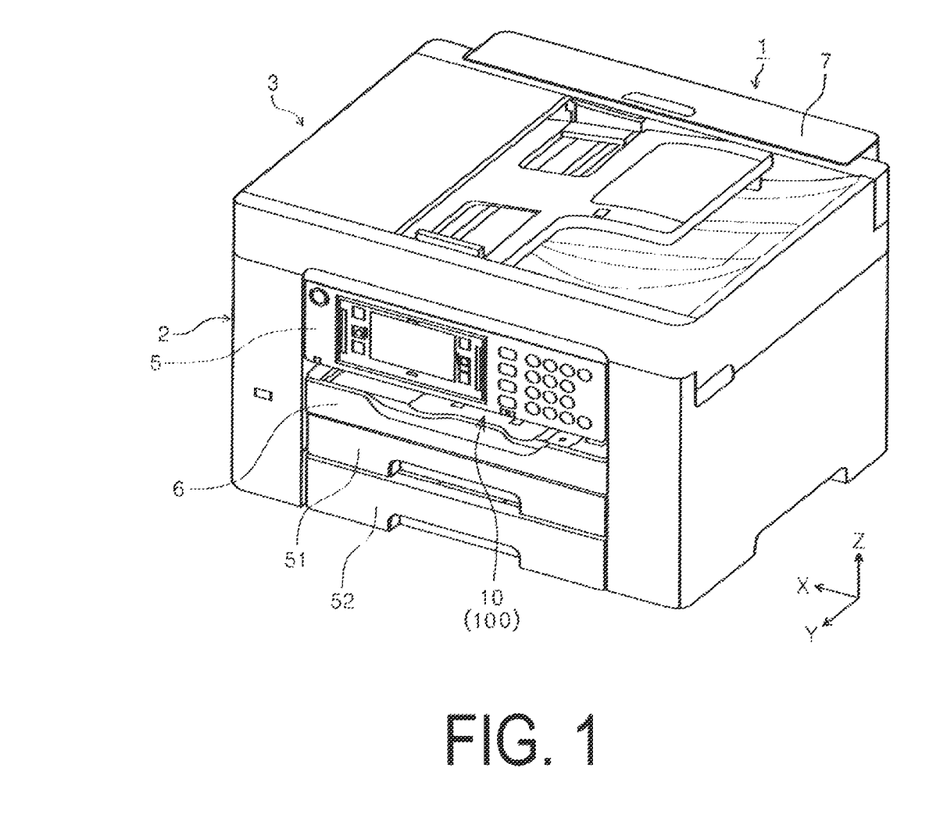
FIG. 1 is a perspective view of a printer of an embodiment 1 as viewed from the front side.

First, an overview of an ink-jet printer 1 of an embodiment 1 serving as an example of a recording device is described. The ink-jet the printer 1 of the present embodiment illustrated in FIG. 1 is a so-called multifunctional device in which a scanner unit 3 is provided at the upper part of a device main body 2. In the following description, an ink-jet printer is simply referred to as "printer". The device main body 2 has a function of performing recording on the recording sheet P, and the scanner unit 3 has a function of reading documents. Note that the scanner unit 3 includes an auto document feeder (ADF) that automatically feeds the set documents.

The device main body 2 includes a conveyance path for conveying the recording sheet P and a recording head 9 serving as an example of a recording unit. In addition, in the present embodiment, the device main body 2 includes two medium housing cassettes, or more specifically, a first sheet cassette 51 and a second sheet cassette 52 in a detachable manner.

In addition, the device main body 2 is configured to enable setting and feeding of the recording sheet P from the back surface of the device, in addition to setting of the recording sheet P to the first sheet cassette 51 and the second sheet cassette 52. The reference numeral 7 indicates a cover for opening and closing a setting port (not illustrated in the drawing) for setting the recording sheet P from the back surface of the device.

The device main body 2 includes the operation unit 5 for performing various operations of the printer 1 in the front surface of the device. The operation unit 5 includes a display unit and a plurality of operation buttons and can be tilted. An outlet 10 that ejects the recording sheet P on which recording has been performed is provided on the bottom side of the operation unit 5, and an ejection tray 6 that receives the ejected recording sheet P is provided on the bottom side of the outlet 10. As illustrated in FIG. 1, the ejection tray 6 is provided in such a manner that it can be housed inside the device main body 2 or pulled from the device main body 2.

Note that in the printer 1 of the present embodiment, the ejection tray 6 is detachable from the device main body 2. Further, as elaborated later, in the state where the ejection tray 6 is removed from the device main body 2, the recording sheet P can be fed using the outlet 10 as an insertion port 100.

Figure 2:
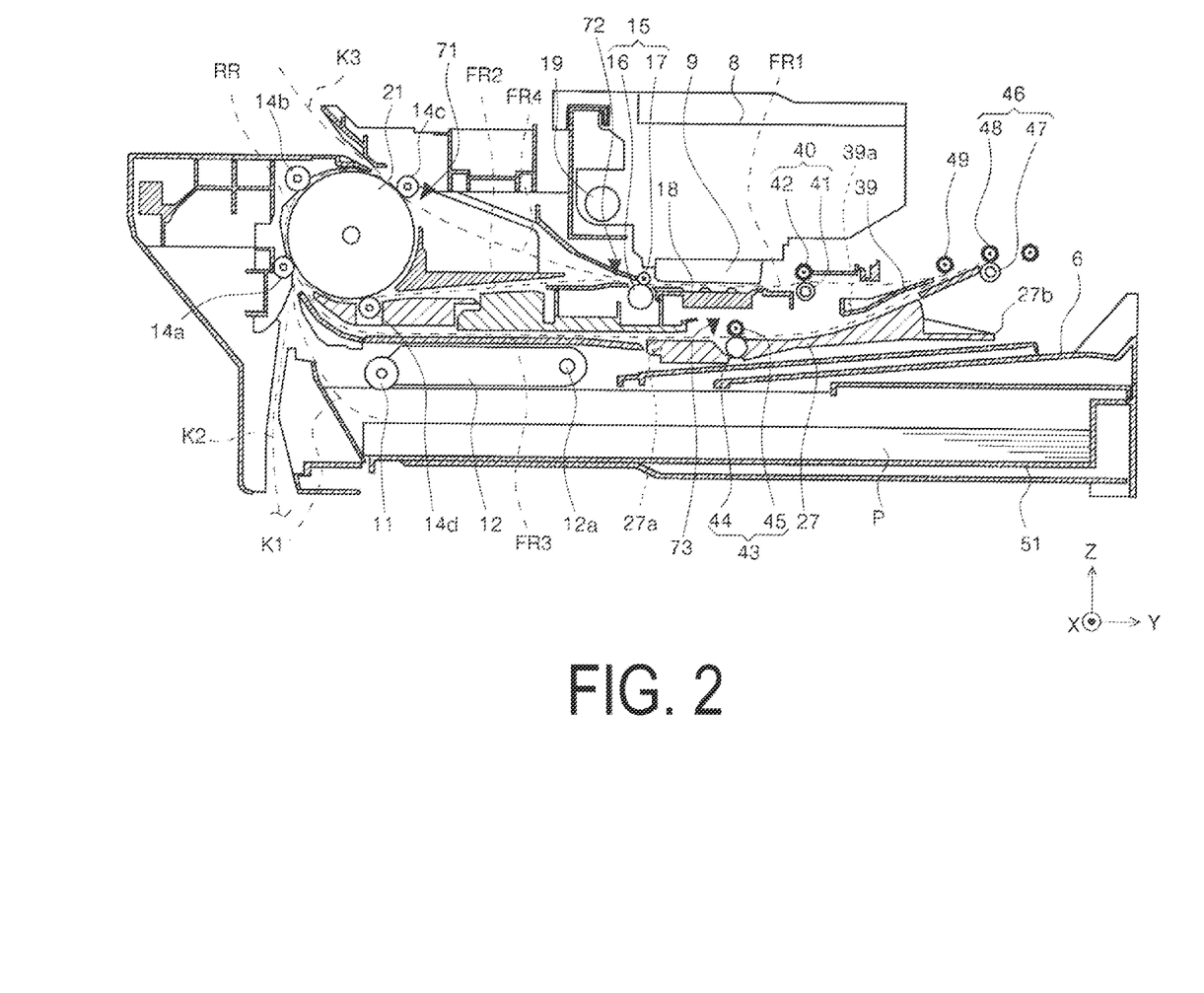
FIG. 2 is a side sectional view illustrating the entirety of a sheet conveyance path of the printer of FIG. 1.

Next, with reference to FIG. 2, a conveyance path of the recording sheet P is described. Note that in FIG. 2, the illustration of the second sheet cassette 52 is omitted. In the printer 1, irrespective of the feeding path, the recording sheet P is conveyed to a conveyance roller pair 15 through an inversion roller 21 that constitutes an inversion path RR, and is conveyed by the conveyance roller pair 15 to the recording region of the recording head 9.

More specifically, the printer 1 includes, as sheet feeding paths, a sheet feeding path K1 for feeding the recording sheet P from the first sheet cassette 51, a sheet feeding path K2 for feeding the recording sheet P from the second sheet cassette 52 below the first sheet cassette 51, and a sheet feeding path K3 for feeding the recording sheet P from a rear upper part of the device by manual feeding.

In addition, the printer 1 includes, as sheet conveyance paths, a first sheet conveyance path FR1, the inversion path RR, and a second sheet conveyance path FR2. The first sheet conveyance path FR1 faces the recording head 9 and can convey the recording sheet P in the first direction (the +Y direction), which is a conveyance direction for performing recording on the recording sheet P, and in the second direction (the −Y direction) opposite to the first direction. The inversion path RR inverts the surface of the recording sheet P. The second sheet conveyance path FR2 guides the recording sheet P on which recording has been performed to the inversion path RR. Further, a third sheet conveyance path FR3 different from the second sheet conveyance path FR2 is provided. The third sheet conveyance path FR3, which is located immediately below the second sheet conveyance path FR2, guides the recording sheet P on which recording has been performed to the inversion path RR.

Note that in the present embodiment, the first sheet conveyance path FR1 is a sheet conveyance path between the conveyance roller pair 15 and a first ejection roller pair 40. In addition, the second sheet conveyance path FR2 is a sheet conveyance path via a driven roller 14$d$ between the conveyance roller pair 15 and a driven roller 14$a$. In addition, the third sheet conveyance path FR3 is a sheet conveyance path via an inversion driving roller 44 between a second ejection roller pair 46 and the driven roller 14$a$. In addition, the inversion path RR is a sheet conveyance path between the driven roller 14$a$ and a driven roller 14$c$. Note that in FIG. 2, the reference numeral FR4 is a fourth sheet conveyance path as a sheet conveyance path between the driven roller 14$c$ and the conveyance roller pair 15.

In the sheet feeding path K1, the recording sheet P is fed by a feed roller 11. The feed roller 11 is supported by a supporting member 12 that sways about a sway axis 12$a$, and the sway of the supporting member 12 moves the feed roller 11 forward and backward with respect to the recording sheet P housed in the first sheet cassette 51. Note that although not illustrated in the drawing, a similar feeding mechanism is provided for the second sheet cassette 52 provided below the first sheet cassette 51.

The inversion roller 21 is formed with the largest diameter compared with other rollers, and inverts the recording sheet P in a curved manner. The driven rollers 14$a$, 14$b$, 14$c$ and 14$d$ are provided around the inversion roller 21. The recording sheet P fed through the sheet feeding paths K1 and K2 is sent to the conveyance roller pair 15 through the inversion path RR and a fourth sheet conveyance path FR4. The recording sheet P fed through the sheet feeding path K3 is sent to the conveyance roller pair 15 through the fourth sheet conveyance path FR4.

The recording sheet P sent along the −Y direction through the second sheet conveyance path FR2 is sent to the conveyance roller pair 15 through the inversion path RR and the fourth sheet conveyance path FR4. In addition, the recording sheet P sent along the −Y direction through the third sheet conveyance path FR3 is sent to the conveyance roller pair 15 through the inversion path RR and the fourth sheet conveyance path FR4.

The conveyance roller pair 15 includes a conveyance driving roller 16 that is driven into rotation and a conveyance driven roller 17 that is driven by rotation. The recording sheet P sent to the conveyance roller pair 15 is nipped by the conveyance driving roller 16 and conveyance driven roller 17 and sent to the region facing the recording head 9, i.e., the recording region, to perform recording.

Figure 3:
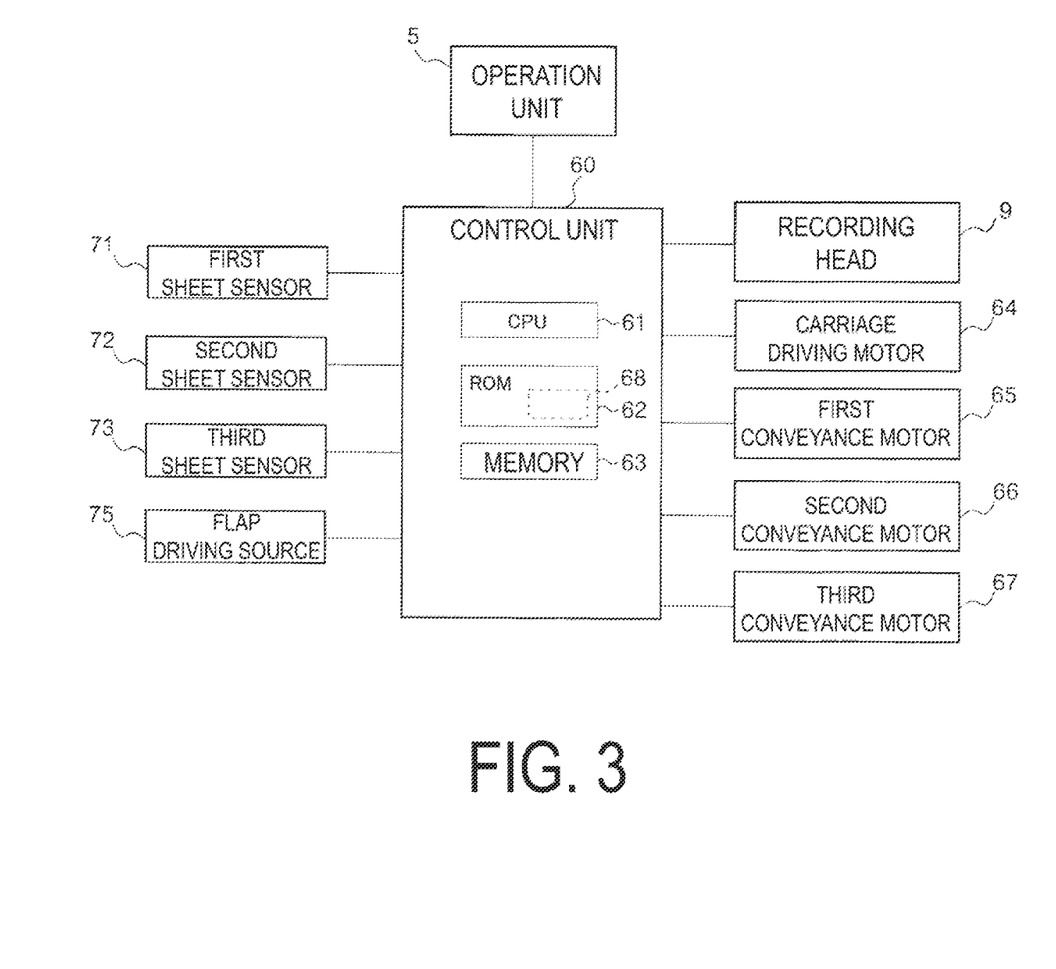
FIG. 3 is a block diagram illustrating a control system of the printer of FIG. 1.

A carriage 8 including the recording head 9 reciprocates in the X-axis direction with the power supplied from a carriage driving motor 64 illustrated in FIG. 3 while being guided by a carriage guide axis 19 extending in the X-axis direction. Along with the movement of the carriage 8, the recording head 9 discharges ink to the recording sheet P.

A supporting member 18 is provided at a position facing the recording head 9, and the recording sheet P on which recording is performed by the recording head 9 is supported by the supporting member 18. The first ejection roller pair 40 that sends downstream the recording sheet P on which recording has been performed is provided downstream of the supporting member 18. Here, "downstream" means downstream in the conveyance direction of the recording sheet P, and, in the first sheet conveyance path FR1, the +Y direction side corresponds to the downstream side. The first ejection roller pair 40 includes a first ejection driving roller 41 that is driven into rotation and a first ejection driven roller 42 that is driven by rotation. In the present embodiment, the first ejection driving roller 41 is a rubber roller, and the first ejection driven roller 42 is a spur that makes point contact with the recording sheet P. The first ejection roller pair 40 is the first roller pair located downstream of the recording head 9.

Further, the second ejection roller pair 46 is provided downstream of the first ejection roller pair 40. The second ejection roller pair 46 includes a second ejection driving roller 47 that is driven into rotation and a second ejection driven roller 48 that is driven by rotation. The reference numeral 49 is a driven roller provided between the first ejection roller pair 40 and the second ejection roller pair 46 and configured to suppress floating of the recording sheet P. In the present embodiment, the second ejection driving roller 47 is a rubber roller, and the second ejection driven roller 48 and a driven roller 49 are spurs that make point contact with the recording sheet P.

The second sheet conveyance path FR2, the third sheet conveyance path FR3, and the inversion path RR are further described below. When recording is performed on the second surface (rear surface) on the side opposite to the first surface (front surface) on which recording has been performed in the recording sheet P, the recording sheet P on which recording has been performed is sent to the inversion path RR. Then, either the second sheet conveyance path FR2 or the third sheet conveyance path FR3 can be selected as the sheet conveyance path. The printer 1 of the present embodiment, which includes the second sheet conveyance path FR2, the third sheet conveyance path FR3, and the inversion path RR, can perform printing on the both surfaces of the recording sheet P, and also can perform recording only on the first surface of the recording sheet P and eject it to the ejection tray 6.

The path length of the third sheet conveyance path FR3 is longer than the path length of the second sheet conveyance path FR2, and accordingly, a control unit 60 of the printer 1 illustrated in FIG. 3 can have a threshold of the sheet length such that the third sheet conveyance path FR3 is selected when the length of the recording sheet P exceeds the threshold whereas the second sheet conveyance path FR2 is selected when the length of the recording sheet P is smaller than the threshold.

When the second sheet conveyance path FR2 is used, the conveyance driving roller 16, the first ejection driving roller 41 and the second ejection driving roller 47 are reversed after the recording on the first surface is completed. In this manner, the recording sheet P is conveyed through the second sheet conveyance path FR2 along the −Y direction to the inversion path RR.

When the third sheet conveyance path FR3 is used, conveyance along the +Y direction is performed until the rear end of the recording sheet P reaches the driven roller 49 after recording on the first surface is completed, and thereafter, the second ejection driving roller 47 is reversed. A flap 39 that is swayable about a sway axis 39$a$ is provided upstream of the driven roller 49, and, when the recording sheet P is sent to the third sheet conveyance path FR3, the orientation of the flap 39 is changed. In this manner, the recording sheet P is sent into the third sheet conveyance path FR3, and sent to the inversion path RR. Here, the flap 39 is driven by a flap driving source 75 illustrated in FIG. 3 that is controlled by the control unit 60.

In the third sheet conveyance path FR3, a conveyance roller pair 43 is provided. The conveyance roller pair 43 includes the inversion driving roller 44 that is driven into rotation and an inversion driven roller 45 that is driven by rotation. In the present embodiment, the inversion driving roller 44 is a rubber roller, and the inversion driven roller 45 is a spur that makes point contact with the recording sheet P.

The second ejection driving roller 47 that constitutes the second ejection roller pair 46 functions as a first driving roller that is rotatable in a forward rotation direction for sending, toward the outlet 10, the recording sheet P conveyed through the first sheet conveyance path FR1 in the first direction, and is rotatable in a reverse rotation direction that is opposite to the forward rotation direction. The second ejection driven roller 48 that constitutes the second ejection roller pair 46 nips the recording sheet P between it and the second ejection driving roller 47. Here, the forward rotation direction is the clockwise direction in FIG. 2, and the reverse rotation direction is the counterclockwise direction in FIG. 2. The second ejection roller pair 46, which is located between the first sheet conveyance path FR1 and the outlet 10, ejects the recording sheet P from the outlet 10 along with the forward rotation of the second ejection driving roller 47, and sends the recording sheet P to the third sheet conveyance path FR3 along with the reverse rotation of the second ejection driving roller 47.

In the printer 1 including the above-mentioned conveyance path of the recording sheet P, the feed roller 11 and the inversion roller 21 are driven by a first conveyance motor 65 illustrated in FIG. 3, the conveyance driving roller 16 and the first ejection driving roller 41 are driven by a second conveyance motor 66 illustrated in FIG. 3, and the second ejection driving roller 47 and the inversion driving roller 44 are driven by a third conveyance motor 67 illustrated in FIG. 3.

Note that a rotation restriction mechanism (not illustrated in the drawing) is provided in a power transfer path from the third conveyance motor 67 to the inversion driving roller 44, and with the rotation restriction mechanism, the inversion driving roller 44 rotates in the direction for conveying the recording sheet P in the −Y direction irrespective of the rotational direction of the third conveyance motor 67. The rotation restriction mechanism may be composed of a mechanism including a one-way clutch or a mechanism including a planetary gear mechanism, for example. On the other hand, the second ejection driving roller 47 rotates forward when the third conveyance motor 67 rotates forward, and reverses when the third conveyance motor 67 reverses.

A control system in the printer 1 is described below with reference to FIG. 3. FIG. 3 is a block diagram illustrating a control system of the printer 1 according to the present disclosure. In FIG. 3, the control unit 60 as a control means performs other various controls of the printer 1, including feeding control and recording control of the recording sheet P. Signals of the operation unit 5 are input to the control unit 60, and signals for implementing the display of the operation unit 5, especially the user interface, are transmitted from the control unit 60 to the operation unit 5.

The control unit 60 controls motors such as the carriage driving motor 64, the first conveyance motor 65, the second conveyance motor 66, and the third conveyance motor 67. In the present embodiment, all these motors are DC motors. In addition, the control unit 60 controls the recording head 9 and the above-described flap driving source 75. Note that although not illustrated in the drawings, the printer 1 includes a sensor that detects the rotation amount of each motor, and the control unit 60 controls each motor on the basis of a detection signal of the sensor.

In addition, a detection signal from each of a first sheet sensor 71, a second sheet sensor 72, and a third sheet sensor 73 is input to the control unit 60, and the control unit 60 performs a required control on the basis of the detection signal. Note that as illustrated in FIG. 2, the first sheet sensor 71 is a sensor provided near the driven roller 14c, the second sheet sensor 72 is a sensor provided near the conveyance roller pair 15, and the third sheet sensor 73 is a sensor provided near the conveyance roller pair 43. With these sensors, passage of the front end or rear end of the recording sheet P at the location of each sensor can be detected. These sensors may be composed of reflection type or transmission type optical sensors, for example. On the basis of the detection signal of each of the above-described sensors and the driving amount of each motor, i.e., each roller, the control unit 60 determines the size of the recording sheet P being conveyed in the conveyance direction, and the front end position and the rear end position of the recording sheet P in the sheet conveyance path.

The control unit 60 includes a CPU 61, a ROM 62, and a memory 63. The CPU 61 performs various arithmetic processes in accordance with a program 68 stored in the ROM 62 to control the entire operation of the printer 1. The memory 63 serving as an example of a storage unit is a readable and writable nonvolatile memory. When executing the program 68, the control unit 60 reads the required data from the memory 63, and writes the required data in the memory 63.

As described above, the printer 1 of the present embodiment can feed the recording sheet P using the outlet 10 as the insertion port 100. In view of this, next, a case where the recording sheet P is fed using the outlet 10 as the insertion port 100 is described in detail with reference to FIG. 2 and FIG. 4.

Figure 4:
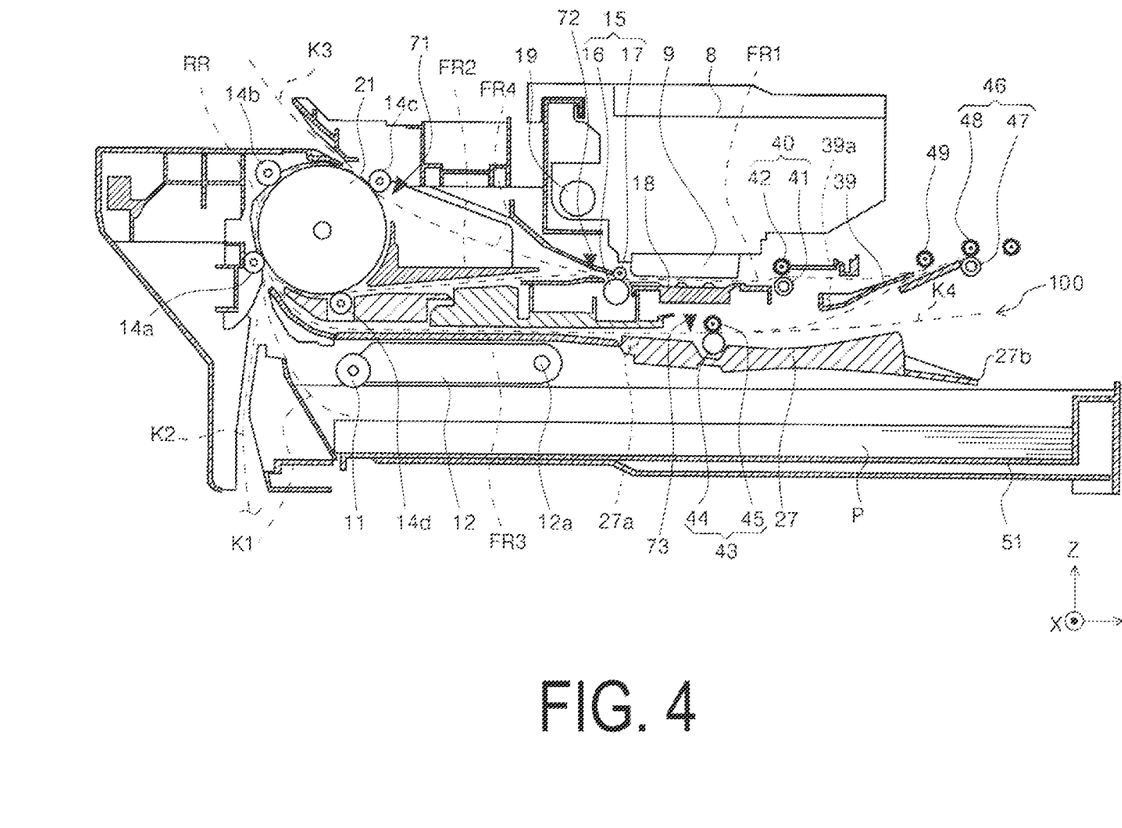
FIG. 4 is a side sectional view illustrating a state where insertion of a recording sheet from an insertion port is enabled in the printer of FIG. 1.

As can be seen by comparing FIG. 2 and FIG. 4, in the printer 1, the ejection tray 6 can be removed from the device main body 2. The printer 1 includes a path cover 27 that constitutes the third sheet conveyance path FR3. The path cover 27 includes a rotation axis 27a at one end, and another end portion 27b at the other end. When the user removes the ejection tray 6 from the device main body 2, and pushes down the other end portion 27b from the state illustrated in FIG. 2 to the state illustrated in FIG. 4, a sheet feeding path K4 from the insertion port 100 to the conveyance roller pair 43 is formed.

Here, as a summary of the above description, the printer 1 of the present embodiment includes the recording head 9 serving as a recording unit that performs recording on the recording sheet P by discharging ink. In addition, as the conveyance path of the recording sheet P, the first sheet conveyance path FR1 is provided as a first conveyance path including the position facing the recording head 9 and configured for conveyance of the recording sheet P in the first direction in recording at the recording head 9. In addition, as the conveyance path of the recording sheet P, the third sheet conveyance path FR3 is provided as a second conveyance path coupled to the first sheet conveyance path FR1 at a downstream position downstream of the recording head 9 in the first direction to convey the recording sheet P recorded by the recording head 9. The third sheet conveyance path FR3 is coupled to the first sheet conveyance path FR1 also at an upstream position upstream of the recording head 9 in the first direction to invert the surface of the recording sheet P and convey the recording sheet P to the first sheet conveyance path FR1. Further, the insertion port 100 that enables insertion of the recording sheet P as an insertion material from the outside to the third sheet conveyance path FR3 is provided.

In this manner, the printer 1 of the present embodiment includes the insertion port 100 that enables insertion of the recording sheet P from the outside to the third sheet conveyance path FR3, and the third sheet conveyance path FR3 serving as an inversion path is used as a path for the user to insert the recording sheet P from the front surface side of the device by manual feeding to feed the recording sheet P. Thus, with the printer 1 of the present embodiment, the user can insert the recording sheet P by manual feeding from the front surface side of the device to feed the recording sheet P without employing a configuration including an additional conveyance path of the recording sheet P. For example, in the state where the recording sheet P is kept housed in the first sheet cassette 51 and the second sheet cassette 52, the user can insert a desired recording sheet P by manual feeding from the insertion port 100 to perform recording on the recording sheet P. Thus, the printer 1 of the present embodiment can achieve multi-functionality without increasing the size of the device.

In addition, as described above, the printer 1 of the present embodiment includes the ejection tray 6 that receives the recording sheet P recorded by the recording head 9 at a position downstream of the position where the second ejection roller pair 46 is formed in the first direction. Further, the printer 1 of the present embodiment is configured such that the recording sheet P can be inserted from the insertion port 100 by removing the ejection tray 6. With such a configuration, in the printer 1 of the present embodiment, the recording sheet P recorded by the recording head 9 can be received by the ejection tray 6. In addition, with the configuration of inserting the recording sheet P from the insertion port 100 by removing the ejection tray 6, it is possible to prevent the ejection tray 6 from hindering the insertion of the recording sheet P.

In addition, as described above, the printer 1 of the present embodiment includes the path cover 27 that constitutes the third sheet conveyance path FR3 and is rotatable around the rotation axis 27a. Here, by rotating the path cover 27 around the rotation axis 27a to adjust the placement, the path cover 27 can support the recording sheet P from the bottom side, and serves also as a feeding guide that guides the insertion of the recording sheet P. Thus, the printer 1 of the present embodiment includes the path cover 27 that constitutes the third sheet conveyance path FR3 and is rotatable around the rotation axis 27a, and therefore, in the case where conveyance failure of the recording sheet P occurs in the third sheet conveyance path FR3, the recording sheet P causing the conveyance failure can be easily removed by rotating the path cover 27. In addition, since the path cover 27 serves also as a feeding guide that guides the insertion of the recording sheet P as described above, the printer 1 of the present embodiment can effectively suppress the increase of the size of the device. Note that the path cover 27 may be provided with an edge guide for setting the position of the recording sheet P in the width direction that intersects the insertion direction.

In addition, as described above, the printer 1 of the present embodiment includes a plurality of sensors, the first sheet sensor 71, the second sheet sensor 72, and the third sheet sensor 73, which can detect passage of the front end or rear end of the recording sheet P. In other words, the printer 1 of the present embodiment includes a plurality of sensors that detect the presence or absence of the recording sheet P. The control unit 60 performs the conveyance control of the recording sheet P on the basis of the detection result of each sensor. For example, it is possible to start the feeding operation of the recording sheet P to the first sheet conveyance path FR1 after passage of the rear end of the recording sheet P is detected by the first sheet sensor 71. Thus, the printer 1 of the present embodiment can suppress touching of the recording sheet P during conveyance or the like, and can suppress conveyance failure of the recording sheet P.

Embodiment 2

Figure 5:
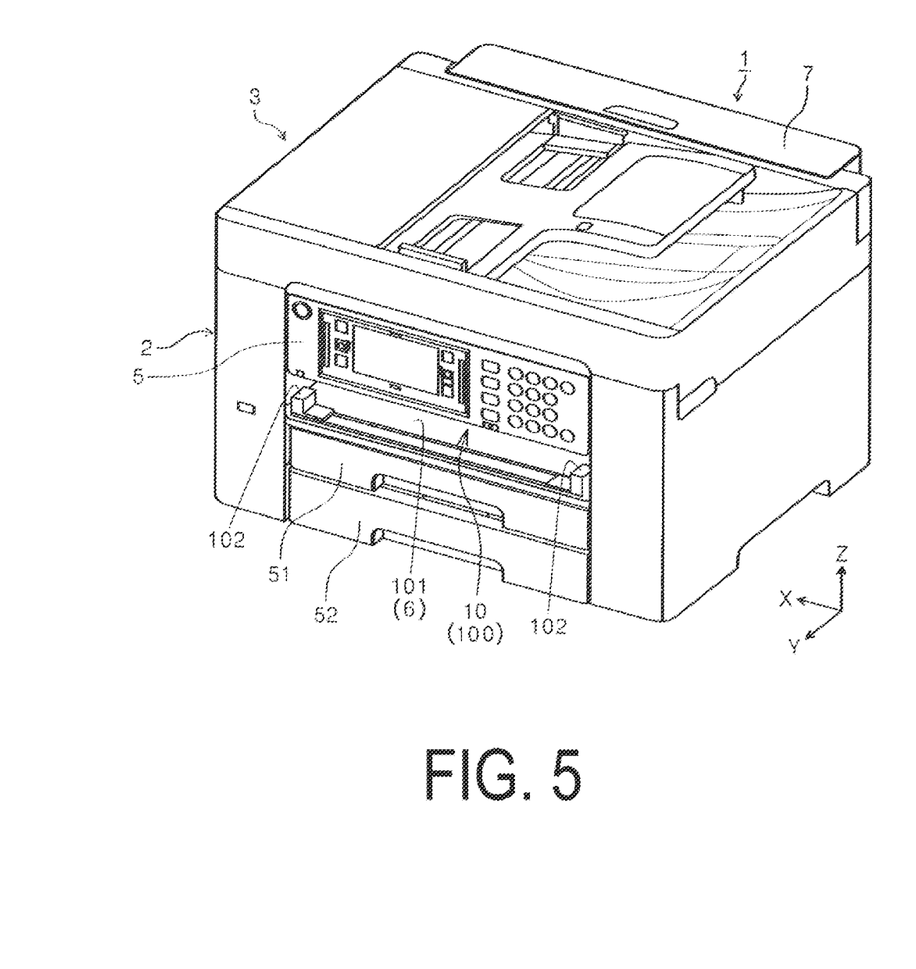
FIG. 5 is a perspective view of a printer of an embodiment 2 as viewed from the front side.
Figure 6:
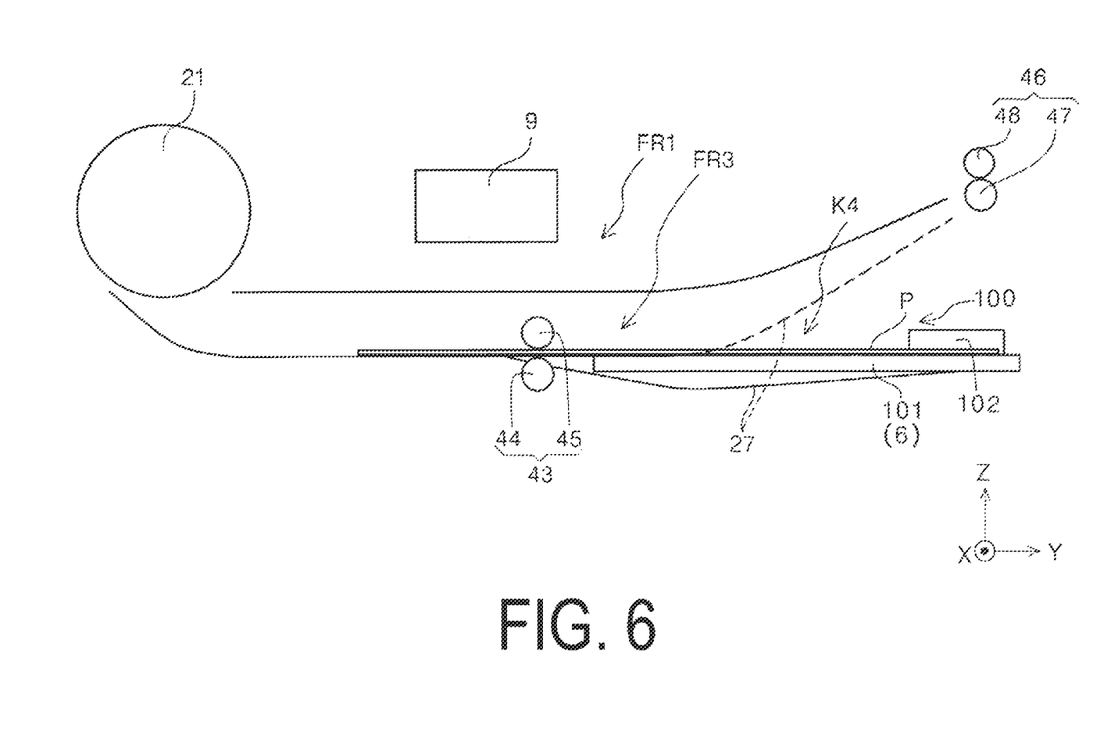
FIG. 6 is a side sectional view schematically illustrating a sheet conveyance path of the printer of FIG. 5.

A printer 1 of an embodiment 2 is described below with reference to FIG. 5 and FIG. 6. Note that FIG. 5 is a drawing corresponding to FIG. 1 illustrating the printer 1 of the embodiment 1. In FIG. 5 and FIG. 6, the same components as those of the embodiment 1 are denoted with the same reference numerals, and the detailed description thereof is omitted.

Here, the printer 1 of the present embodiment has the same features as those of the above-described printer 1 of the embodiment 1 and the same configuration as those of the printer 1 of the embodiment 1 except for the parts described below. More specifically, the configuration is the same as that of the printer 1 of the embodiment 1 except that a feeding guide 101 that serves also as the ejection tray 6 can be attached after the ejection tray 6 is removed. In view of this, the description for the printer 1 of the embodiment 1 with reference to FIG. 1 FIG. 4 applies also to the printer 1 of the present embodiment, except for the part related to the feeding guide 101.

In the printer 1 of the present embodiment, the ejection tray 6 of the printer 1 of the embodiment 1 is detachable, and, in the state where the ejection tray 6 is attached to the printer 1 of the present embodiment, the configuration is the same as that of the state where the ejection tray 6 is attached in the printer 1 of the embodiment 1. Further, as illustrated in FIG. 5 and FIG. 6, the feeding guide 101 is detachable in the printer 1 of the present embodiment. Note that when attaching the feeding guide 101 to the printer 1, it is attached after rotating the path cover 27 from the broken line position to the solid line position as illustrated in FIG. 6.

That is, in the printer 1 of the present embodiment, the ejection tray 6 that receives the recording sheet P recorded by the recording head 9 is disposed downstream of the downstream position serving as the coupling position between the first sheet conveyance path FR1 and the third sheet conveyance path FR3 in the first direction, and the feeding guide 101 that guides the insertion of the recording sheet P is attachable in place of the ejection tray 6. With such a configuration, in the printer 1 of the present embodiment, the recording sheet P recorded by the recording head 9 can be received at the ejection tray 6, and the feeding guide 101 that guides the insertion of the recording sheet P is attachable in place of the ejection tray 6, and thus, it is possible to increase the ease of the insertion of the recording sheet P from the insertion port 100 while suppressing the increase of the size of the device.

In addition, as described above, the feeding guide 101 serves also as the ejection tray 6 that receives the recording sheet P recorded by the recording head 9. Specifically, the recording sheet P supplied to the first sheet conveyance path FR1 from the sheet feeding path K1, the sheet feeding path K2, the sheet feeding path K3 or the sheet feeding path K4 and recorded by the recording head 9 can be received at the feeding guide 101. Thus, the recording sheets P recorded by the recording head 9 can be received at the feeding guide 101 without scattering them, and the increase of the size of the device can be suppressed by eliminating the necessity of additionally providing the ejection tray 6. Note that by employing a configuration including a reading unit that reads a document M in the third sheet conveyance path FR3 as in the printer 1 of the embodiment 3 and embodiment 4 described later, the feeding guide 101 can receive the document M.

Here, as illustrated in FIG. 5 and FIG. 6, the feeding guide 101 is provided with an edge guide 102 that can move along in the X-axis direction. In other words, the feeding guide 101 includes the edge guide 102 for positioning in the width direction that intersects the insertion direction of the recording sheet P. Thus, the placement of the recording sheet P put at the feeding guide 101 in the width direction can be optimized, and conveyance failure of the recording sheet P can be suppressed.

Note that in the printer 1 of the embodiment 1 and the printer 1 of the present embodiment, the conveyance roller pair 43 is used as a roller pair that supplies the recording sheet P to the third sheet conveyance path FR3. However, instead of using the conveyance roller pair 43 as a roller pair for supplying the recording sheet P to the third sheet conveyance path FR3, the second ejection roller pair 46 may be used as a roller pair for supplying the recording sheet P to the third sheet conveyance path FR3.

Embodiment 3

Figure 7:
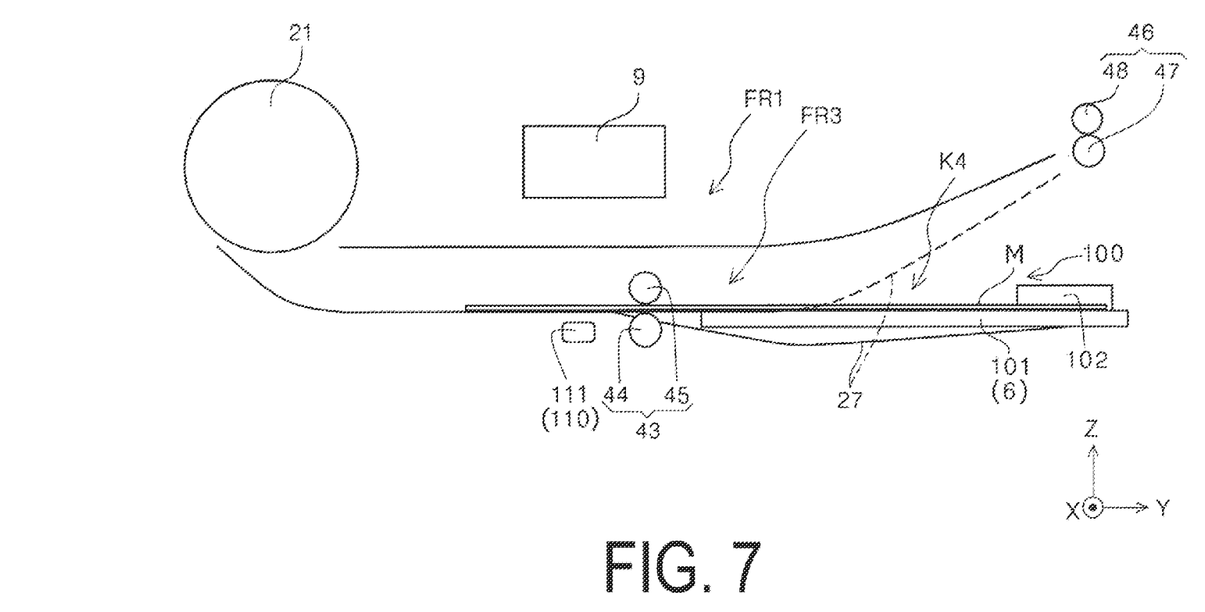
FIG. 7 is a side sectional view schematically illustrating a sheet conveyance path of a printer of an embodiment 3.

A printer 1 of an embodiment 3 is described below with reference to FIG. 7. Note that FIG. 7 is a drawing corresponding to FIG. 6 illustrating the printer 1 of the embodiment 2. In FIG. 7, the same components as those of the embodiment 1 and the embodiment 2 are denoted with the same reference numerals, and the detailed description thereof is omitted.

Here, in comparison with the above-described printer 1 of the embodiment 2, the printer 1 of the present embodiment does not include the scanner unit 3, but includes a contact image sensor module (CISM) 110 in the third sheet conveyance path FR3 in place of the scanner unit 3. As a result, the size of the printer 1 of the present embodiment is smaller than the printer 1 of the embodiment 1 and the printer 1 of the embodiment 2. Note that except for the part related to the scanner unit 3, the description for the printer 1 of the embodiment 1 and the printer 1 of the embodiment 2 applies also to the printer 1 of the present embodiment.

In the printer 1 of the present embodiment, as in the printer 1 of the embodiment 2, the feeding guide 101 is attachable in place of the ejection tray 6, and the document M put at the feeding guide 101 can be fed from the sheet feeding path K4 to the third sheet conveyance path FR3. In view of this, except for the part related to the feeding guide 101 and the part related to the scanner unit 3, the parts in the printer 1 of the embodiment 1 described with reference to FIG. 1 to FIG. 4 can be understood by replacing the recording sheet P with the document M.

As illustrated in FIG. 7, the printer 1 of the present embodiment includes the CISM 110 provided in the third sheet conveyance path FR3. The CISM 110 includes a first reading unit 111 that reads the document M. Thus, the document M can be read, and the read image can be recorded on the recording sheet P without employing a configuration including a large reading unit that reads the document M such as the scanner unit 3, for example. Accordingly, the printer 1 of the present embodiment can achieve multi-functionality without increasing the size of the device.

In addition, as illustrated in FIG. 7, the printer 1 of the present embodiment includes the third sheet conveyance path FR3 serving as an inversion path. With the inversion path, the images on both surfaces of the document M can be read. Further, the insertion port 100 that enables insertion of the document M as an insertion material to the third sheet conveyance path FR3 from the outside is provided. That is, the third sheet conveyance path FR3 serving as the inversion path can be used as a path for the user to insert the document M from the front surface side of the device by manual feeding to feed the document M. In this manner, images can be read while feeding the document M by inserting the document M by manual feeding by the user without employing a configuration including an additional conveyance path of the document M. Thus, multi-functionality can be achieved without increasing the size of the device.

Here, in the printer 1 of the present embodiment, as in the printer 1 of the embodiment 2, recording on the recording sheet P can be performed by supplying the recording sheet P from the insertion port 100. Further, the printer 1 of the present embodiment can record an image on the rear surface of the document M on which an image has been formed on its front surface, using the rear surface of the document M as a recording surface of a recording target medium.

As illustrated in FIG. 7, the first reading unit 111 is provided on the bottom side of the third sheet conveyance path FR3, and the front surface and the rear surface of the document sent from the third sheet conveyance path FR3 to the first sheet conveyance path FR1 are inverted. That is, the first reading unit 111 is disposed in the third sheet conveyance path FR3 such that the surface of the document M facing the recording head 9 in the first sheet conveyance path FR1 can be read. Thus, for example, in the case where the document M is used as a recording target medium and an image is recorded on the surface that is the rear surface of the document M opposite to the image reading surface, the printer 1 of the present embodiment can prevent the recording head 9 from mistakenly forming an image on the front surface of the document M. A reason for this is that when the first reading unit 111 detects that an image is formed on the document M in advance, it is possible to recognize that the document M has been mistakenly inserted upside down.

The printer 1 of the present embodiment can perform copy recording in which an image of the document M is read and the read image is recorded on the recording sheet P. For example, the document M having an image as a copy source is inserted to the third sheet conveyance path FR3 through the feeding guide 101, and the document M is ejected through the first sheet conveyance path FR1. Thereafter, recording can be performed in the first sheet conveyance path FR1 by conveying the recording sheet P for forming the image to the first sheet conveyance path FR1 from any of the feeding guide 101, the first sheet cassette 51 and the second sheet cassette 52. In the copy recording, the mediums of two types, the document M and the recording sheet P, pass through the conveyance path. In this case, regarding a problem resulting from the mixture of the document M and the recording sheet P, the document M that is ejected first can be returned to the feeding guide 101 again. Since the positions of the second ejection roller pair 46 and the conveyance roller pair 43 are different from each other in the Y-axis direction and the end portions of the ejected document M and recording sheet P are shifted from each other, it is easier to distinguish between the document M and the recording sheet P.

Note that the first reading unit 111 can read the image of the document M, and can detect the end portions of the document M and the recording sheet P. It is thus possible to perform conveyance control of the document M and the recording sheet P in the conveyance path through the use of the data read by the first reading unit 111 in addition to the detection results of the first sheet sensor 71, the second sheet sensor 72, the third sheet sensor 73. In addition, while the lengths of the document M and the recording sheet P in the conveyance direction can be detected by detecting both end portions of the document M and the recording sheet P by the first reading unit 111, the distance from the location where the CISM 110 is formed to the location facing the recording head 9 can be increased by providing the CISM 110 including the first reading unit 111 in the third sheet conveyance path FR3. Thus, by providing the CISM 110 in the third sheet conveyance path FR3, proper conveyance control can be performed even in the case where the document M and the recording sheet P that are long in the conveyance direction are used.

Embodiment 4

Figure 8:
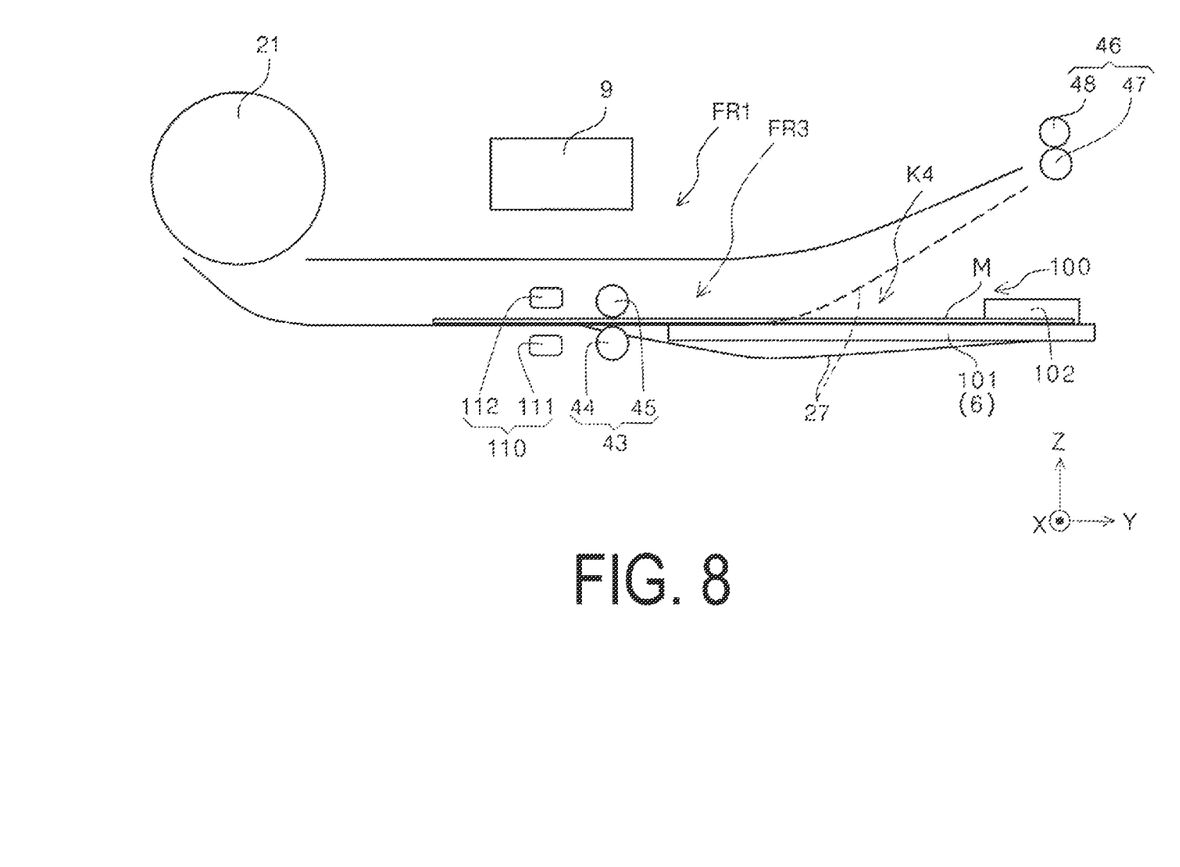
FIG. 8 is a side sectional view schematically illustrating a sheet conveyance path of a printer of an embodiment 4.

A printer 1 of the embodiment 4 is described below with reference to FIG. 8. Note that FIG. 8 is a drawing corresponding to FIG. 7 illustrating the printer 1 of the embodiment 3. In FIG. 8, the same components as those of the embodiments 1 to 3 are denoted with the same reference numerals, and the detailed description thereof is omitted.

Here, the printer 1 of the present embodiment has the same configuration as that of the above-described printer 1 of embodiment 3 except that the CISM 110 includes a second reading unit 112 in addition to the first reading unit 111. Specifically, as illustrated in FIG. 8, the CISM 110 of the present embodiment includes the first reading unit 111 and the second reading unit 112. The first reading unit 111 is disposed in the third sheet conveyance path FR3 in such a manner as to enable reading of the surface of the document M that faces the recording head 9 in the first sheet conveyance path FR1. The second reading unit 112 is disposed in the third sheet conveyance path FR3 in such a manner as to enable reading of the surface of the document M that faces away from the recording head 9 in the first sheet conveyance path FR1.

As described above, in the printer 1 of the present embodiment, the first reading unit 111 and the second reading unit 112 are disposed in the third sheet conveyance path FR3 in such a manner as to enable reading of both surfaces of the document M. Thus, the printer 1 of the present embodiment can efficiently read the document M.

With the CISM 110 capable of reading both surfaces of the document M, it is possible to determine whether the insertion material fed to the third sheet conveyance path FR3 from the sheet feeding path K4 serving as a manual feeding path is a blank sheet or the document M on which an image is formed. When an insertion material on which an image is formed is detected, it is possible to avoid overwriting recording on the document M on which an image is formed by not performing the recording on the insertion material. In addition, likewise, even in the case where, in recording of both surfaces of the recording sheet P, the recorded recording sheet P is ejected to the feeding guide 101 and a pre-recording recording sheet P and the recorded recording sheet P are mixed in the feeding guide 101, the CISM 110 capable of reading both surfaces of the document M can avoid overwriting of an image on the recorded recording sheet P.

Note that the present disclosure is not limited to the above embodiments. Various modification may be made within the scope of the invention described in the claims, and such modification are also included within the scope of the invention.

What is claimed is:
1. A recording device comprising:
a recording head configured to perform recording on a recording target medium;
a first conveyance path that is a conveyance path of the recording target medium including an opposite position that faces the recording head, the first conveyance path being configured for conveyance of the recording target medium in a first direction when recording is performed by the recording head;
a second conveyance path that is a conveyance path of the recording target medium, the second conveyance path being coupled to the first conveyance path at a position downstream of the recording head in the first direction and configured for conveyance of the recording target medium on which recording was performed by the recording head, the second conveyance path being coupled to the first conveyance path also at a position upstream of the recording head in the first direction and configured for conveyance of the recording target medium to the first conveyance path with a surface of the recording target medium inverted;
an insertion port configured to enable insertion of a recording target medium as an insertion material to the second conveyance path from outside; and
an ejection roller pair is provided for ejecting the recording target medium on which the recording has been performed,
wherein the insertion port is arranged below the ejection roller pair.
2. The recording device according to claim 1, comprising an ejection tray configured to receive the recording target medium on which recording was performed by the recording head,
wherein the insertion material is insertable through the insertion port when the ejection tray is removed.
3. The recording device according to claim 2, comprising a path cover configured to constitute the second conveyance path, the path cover being rotatable around a rotation axis,
wherein the path cover also serves as a feeding guide configured to guide the insertion of the insertion material by adjusting a position thereof by rotating around the rotation axis.
4. The recording device according to claim 1, comprising an ejection tray configured to receive the recording target medium on which recording was performed by the recording head,
wherein a feeding guide configured to guide the insertion of the insertion material, in place of the ejection tray, is attachable to the recording device.
5. The recording device according to claim 4, wherein the feeding guide includes an edge guide configured to perform positioning in a width direction that intersects an insertion direction of the insertion material.
6. The recording device according to claim 4, wherein the feeding guide also serves as an ejection tray configured to receive the recording target medium on which recording was performed by the recording head and/or a document read by a reading sensor configured to read the document.
7. The recording device according to claim 4, comprising a sensor configured to detect presence and absence of the recording target medium and the insertion material, wherein conveyance control of the recording target medium and the insertion material is performed based on a detection result of the sensor.

8. A recording device comprising:
- a recording head configured to perform recording on a recording target medium;
- a first conveyance path that is a conveyance path of the recording target medium including an opposite position that faces the recording head, the first conveyance path being configured for conveyance of the recording target medium in a first direction when recording is performed by the recording head;
- a second conveyance path that is a conveyance path of the recording target medium, the second conveyance path being coupled to the first conveyance path at a position downstream of the recording head in the first direction and configured for conveyance of the recording target medium on which recording was performed by the recording head, the second conveyance path being coupled to the first conveyance path also at a position upstream of the recording head in the first direction and configured for conveyance of the recording target medium to the first conveyance path with a surface of the recording target medium inverted;
- a reading sensor provided in the second conveyance path and configured to read a document;
- an insertion port configured to enable insertion of the document as an insertion material to the second conveyance path from outside;
- an ejection tray configured to receive the recording target medium on which recording was performed by the recording head,
- wherein a feeding guide configured to guide the insertion of the insertion material, in place of the ejection tray, is attachable to the recording device.

9. The recording device according to claim 8, wherein the reading sensor is disposed in the second conveyance path such that a surface of the document that faces the recording head in the first conveyance path is readable.

10. The recording device according to claim 9, wherein the reading sensor is disposed in the second conveyance path such that both surfaces of the document are readable.

\* \* \* \* \*